United States Patent
Ota

(10) Patent No.: US 7,413,333 B2
(45) Date of Patent: Aug. 19, 2008

(54) LIGHTING APPARATUS AND LIQUID CRYSTAL DISPLAY APPARATUS

(75) Inventor: Tsutomu Ota, Himeji (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 80 days.

(21) Appl. No.: 11/246,202

(22) Filed: Oct. 11, 2005

(65) Prior Publication Data

US 2006/0087487 A1    Apr. 27, 2006

(30) Foreign Application Priority Data

Oct. 26, 2004   (JP)   ............................. 2004-311262

(51) Int. Cl.
*F21V 7/04* (2006.01)
(52) U.S. Cl. .................. 362/613; 362/612; 362/800
(58) Field of Classification Search ......... 362/600–634, 362/561, 800, 26, 27, 30, 227; 349/61, 65; 345/102

See application file for complete search history.

(56) References Cited

U.S. PATENT DOCUMENTS 6,981,792 B2 *  1/2006  Nagakubo et al. ........... 362/600

FOREIGN PATENT DOCUMENTS

JP    2001-76525    3/2001

* cited by examiner

*Primary Examiner*—Bao Q Truong
(74) *Attorney, Agent, or Firm*—Oblon, Spivak, McClelland, Maier & Neustadt, P.C.

(57) ABSTRACT

A lighting apparatus including a light guiding plate, and a light source including a plurality of light-emitting elements which emit light at a plurality of brightness levels. The light emitting elements is provided opposite to a side edge of the light guiding plate and arranged along the side edge of the light guiding plate. The light-emitting elements are divided into a plurality of sets according to the brightness levels, and light-emitting elements in each of the sets are connected in series.

9 Claims, 2 Drawing Sheets

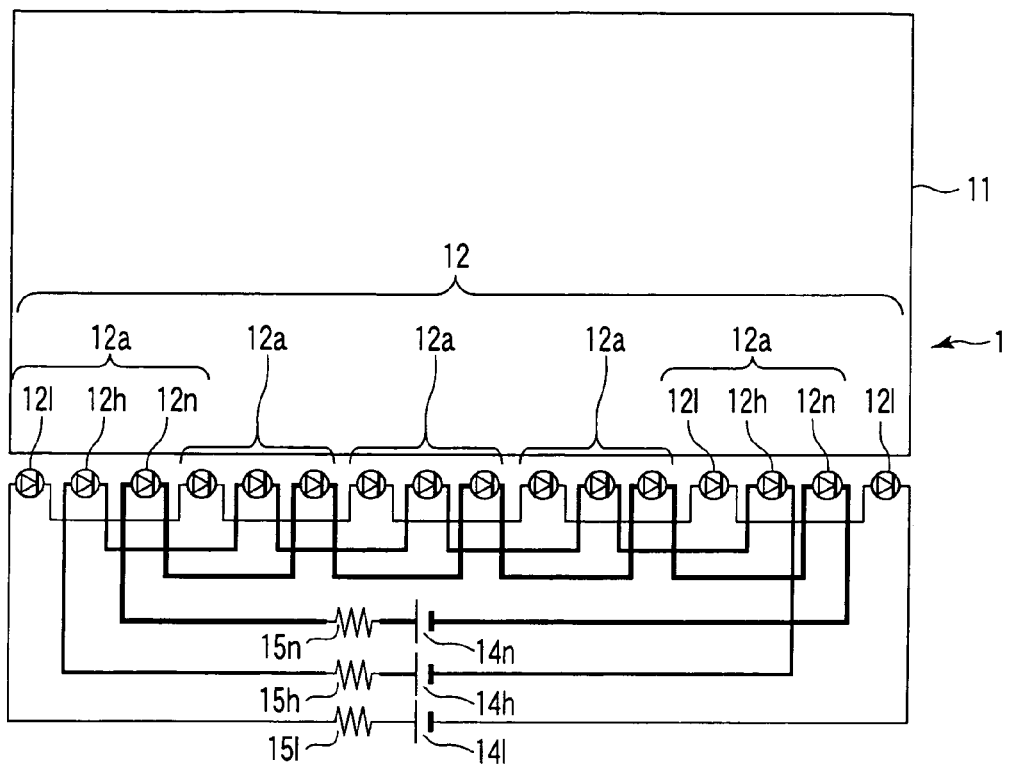
F I G. 3
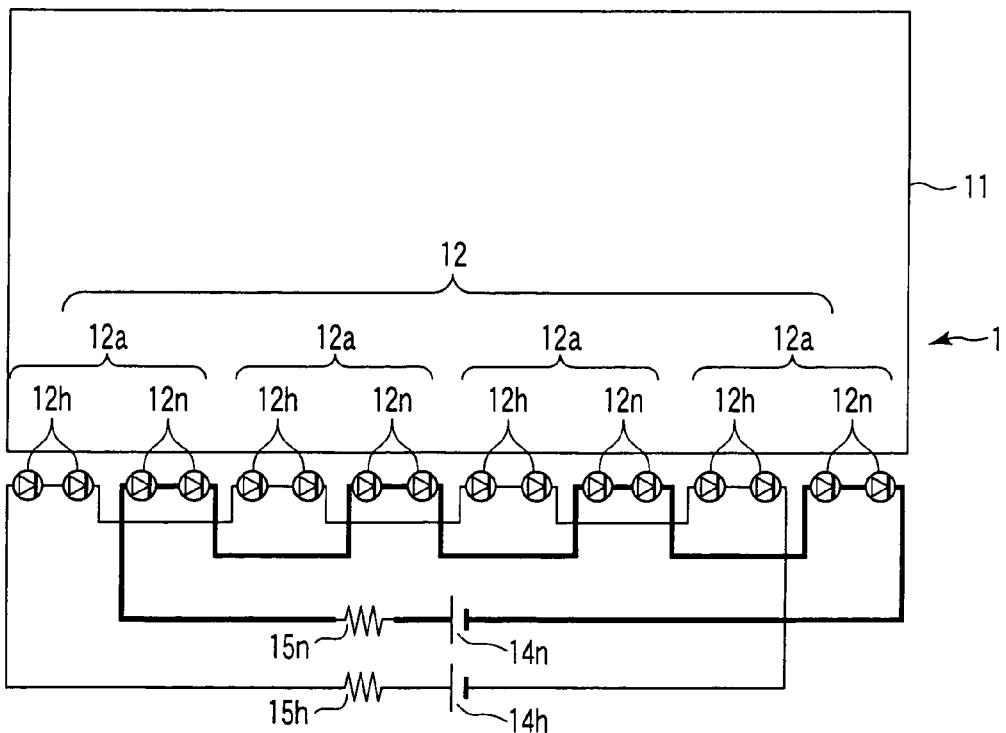
F I G. 4

LIGHTING APPARATUS AND LIQUID CRYSTAL DISPLAY APPARATUS

CROSS-REFERENCE TO RELATED APPLICATIONS

This application is based upon and claims the benefit of priority from prior Japanese Patent Application No. 2004-311262, filed Oct. 26, 2004, the entire contents of which are incorporated herein by reference.

BACKGROUND OF THE INVENTION

1. Field of the Invention

This invention relates to a lighting apparatus and a liquid crystal display apparatus having the lighting apparatus.

2. Description of the Related Art

In recent years, liquid crystal display apparatuses used for car navigation systems and the like are required to have display property with high brightness. Such liquid crystal display apparatuses have a liquid crystal display panel and a back light unit. The liquid crystal display panel has an array substrate, an opposed substrate which is arranged opposed to the array substrate with a gap therebetween, and a liquid crystal layer held therebetween. The array substrate and the opposed substrate are adhered to each other by a sealing member provided on edge portions of the substrates.

The back light unit is provided on a back side of a display surface of the liquid crystal display panel, that is, on an external side of the array substrate. The back light unit has a light guiding plate including a light emission surface, and a light source arranged opposite to a side edge of the light guiding plate. Generally, a cathode-ray tube is used as the light source. Recently, light-emitting diodes (referred to as "LED" hereinafter) with high brightness have been developed, and an LED can be used as the light source.

A liquid crystal display device having a display screen with a size of 6 to 7 inches uses 20 or more LEDs to obtain display property with high brightness, and these LEDs are arranged along a side edge of the light guiding plate. An IC for driving an LED does not have a capacity to drive 20 LEDs connected in series. Therefore, as disclosed in Jpn. Pat. Appln. KOKAI Pub. No. 2001-76525, for example, LEDs are connected in parallel to form two or more circuits and driven. This enables a liquid crystal display apparatus to have display property with high brightness.

The above LEDs vary in brightness level due to error in manufacturing, and are classified into three types, that is, high-brightness LEDs, normal-brightness LEDs, and low-brightness LEDs. If the back light unit is formed by using LEDs having variations in brightness, a display image may have uneven brightness. Therefore, it is necessary to select LEDs having a brightness level of one of the above three types for the back light unit, to prevent unevenness in brightness.

However, if the back light unit is formed by using only LEDs having a brightness level of one type, use efficiency of the LEDs reduces since LEDs having brightness levels of the other two types are not used. Further, since the manufacturing cost of the LEDs is expensive, the price of the product rises.

The present invention has been made in view of the above. The object of the present invention is to provide a lighting apparatus and a liquid crystal display apparatus having the lighting apparatus, which can reduce the manufacturing cost and suppress unevenness in brightness.

BRIEF SUMMARY OF THE INVENTION

To solve the above problems, a lighting apparatus according to an aspect of the present invention comprises: a light guiding plate; and a light source including a plurality of light-emitting elements which emit light at a plurality of brightness levels, the light emitting elements being provided opposite to a side edge of the light guiding plate and arranged along the side edge of the light guiding plate, wherein the light-emitting elements are divided into a plurality of sets according to the brightness levels, and light-emitting elements in each of the sets are connected in series.

Further, a liquid crystal display apparatus according to another aspect of the present invention comprises: a lighting apparatus having a light guiding plate, and a light source including a plurality of light-emitting elements which emit light at a plurality of brightness levels, the light emitting elements being provided opposite to a side edge of the light guiding plate and arranged along the side edge of the light guiding plate; and a liquid crystal display panel having an array substrate provided opposite to a light emission surface of the light guiding plate, an opposed substrate provided opposite to the array substrate with a gap therebetween, and a liquid crystal layer held between the array substrate and the opposed substrate, wherein the light-emitting elements are divided into a plurality of sets according to the brightness levels, and light-emitting elements in each of the sets are connected in series.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic plan view illustrating a modification of the back light unit.

FIG. 4 is a schematic plan view illustrating other modification of the back light unit.

DETAILED DESCRIPTION OF THE INVENTION

A back light unit and a liquid crystal display apparatus having the back light unit according to an embodiment of the present invention are explained in detail below with reference to drawings.

Figure 1:
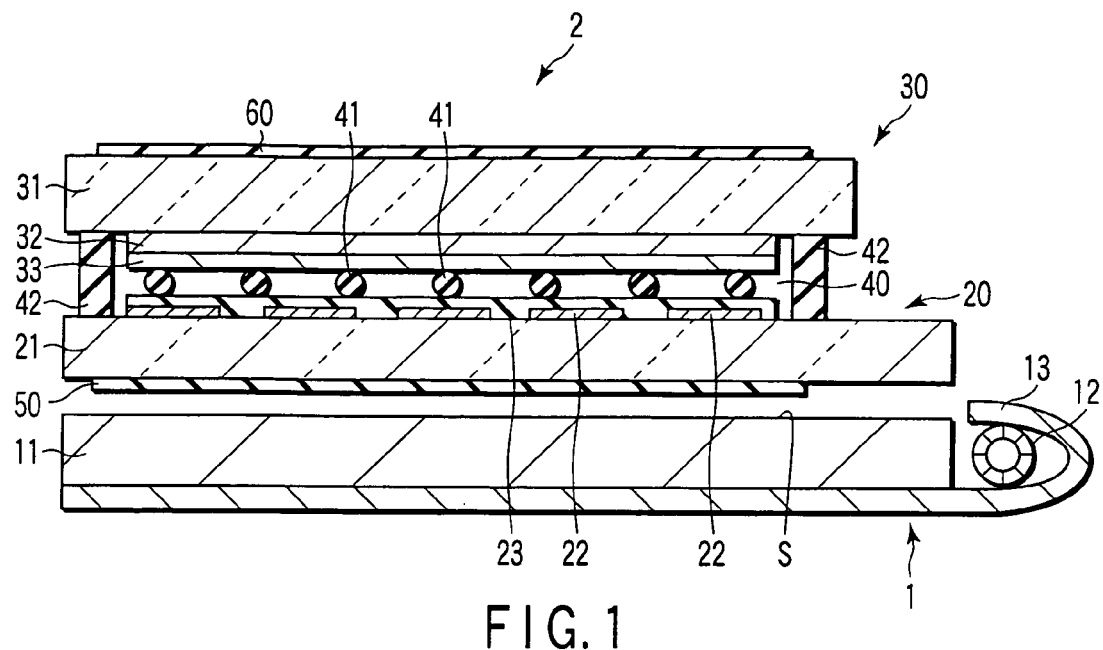
FIG. 1 is a cross-sectional view of a liquid crystal display apparatus according to an embodiment of the present invention.

As shown in FIG. 1, the liquid crystal display apparatus has a display screen with a size of 6 to 7 inches, and comprises a back light unit 1 serving as a lighting apparatus, and a liquid crystal display panel 2.

Figure 2:
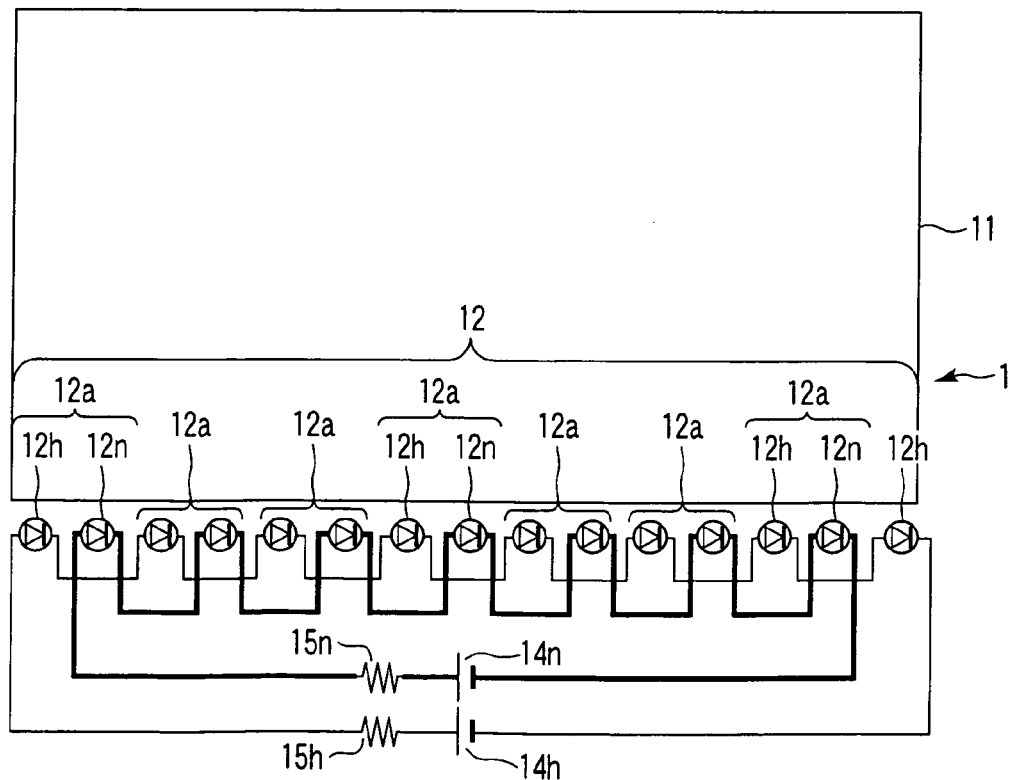
FIG. 2 is a schematic plan view of a back light unit illustrated in FIG. 1.

As shown in FIGS. 1 and 2, the back light unit 1 has light guiding plate 11 including a light emission surface S, a light source 12 and a reflector plate 13. The back light unit 1 may be formed by providing an optical system such as a prism sheet and a diffusion film (not shown) on the light guiding plate 11. The light source 12 is provided opposite to a side edge of the light guiding plate 11. The reflector plate 13 is open in a region opposed to the light emission surface S, and covers the light guiding plate 11 and the light source 12.

The light source 12 is explained in detail. The light source 12 is formed by arranging a plurality of light-emitting element groups 12a along a side edge of the light guiding plate 11. Each light-emitting element group 12a includes one normal-brightness LED 12n and one high-brightness LED 12h which emits light with a brightness higher than that of the normal-brightness LED, as a plurality of light-emitting elements having brightness levels different from each other. The normal-brightness LED 12n and the high-brightness LED 12h are arranged along the side edge of the light guiding plate 11. The light-emitting element groups 12a are formed by arranging respective normal-brightness LEDs 12n and respective high-brightness LED 12h in the same order through the light-emitting element groups. Therefore, the normal-brightness LEDs 12n and the high-brightness LEDs 12h alternate along the edge of the light guiding plate 11.

The normal-brightness LEDs 12n and the high-brightness LEDs 12h are divided into two sets according to the brightness levels, and LEDs in each of the sets are connected in series. Specifically, all the normal-brightness LEDs 12n, a power source 14n and a resistor 15n are connected in series. Further, all the high-brightness LEDs 12h, a power source 14h different from the power source 14n and a resistor 15h are connected in series.

As shown in FIG. 1, the liquid crystal display panel 2 has an array substrate 20 provided opposite to the light emission surface S, an opposed substrate 30, a liquid crystal layer 40, a first polarizer 50, and a second polarizer 60.

The array substrate 20 has a glass substrate 21, a plurality of pixel electrodes 22 formed on the glass substrate 21, and an alignment film 23 formed on the pixel electrodes 22 and the glass substrate 21. The array substrate 20 also has various wiring (not shown) and thin-film transistors serving as switching elements formed on the glass substrate 21, etc.

The opposed substrate 30 has a glass substrate 31, a common electrode 32 formed on the glass substrate 31, and an alignment film 33 formed on the common electrode 32. The pixel electrodes 22 and the common electrode 32 are formed of a transparent conductive material such as ITO (indium tin oxide). The alignment film 23 and the alignment film 33 are subjected to rubbing as an alignment film treatment process.

The array process 20 and the opposed process 30 are arranged opposite to each other with a predetermined gap by a plurality of spacers 41. The array process 20 and the opposed substrate 30 are adhered to each other by a sealing member 42 provided on edge portions of the boards. The liquid crystal layer 40 is held between the array substrate 20, the opposed substrate 30 and the sealing member 42. The first polarizer 50 is disposed on an external surface of the array substrate 20, and the second polarizer 60 is disposed on an external surface of the opposed substrate 30.

According to the liquid crystal display apparatus having the above structure, the back light unit 1 has the normal-brightness LEDs 12n and the high-brightness LEDs 12h. Therefore, even if LEDs are manufactured with variations in brightness due to error in manufacturing, such as the high-brightness LEDs 12h and the normal-brightness LEDs 12n, it is possible to form the back light unit 1 by using LEDs of two types of brightness levels, that is, high-brightness LEDs and normal-brightness LEDs. The back light unit 1 of the embodiment achieves an improved use efficiency of LEDs and a reduced manufacturing cost, in comparison with a back light unit formed by using LEDs of one type of brightness level. This enables suppression of rise in the price of the back light unit 1, and consequently the price of the liquid crystal display apparatus.

Further, the normal-brightness LEDs 12n and the high-brightness LEDs 12h are alternately provided along the edge of the light guiding plate 11. The normal-brightness LED 12n are connected in series, and the high-brightness LEDs 12h are connected in series. Therefore, it is possible to suppress unevenness in brightness occurring on the light emission surface S, and consequently suppress unevenness in brightness occurring on the display screen, independently of variations in brightness of the LEDs and presence/absence of variations in power of the power sources 14n and 14h. Furthermore, it is possible to achieve image display with a sufficient brightness, even if the liquid crystal display apparatus is used for products required to have high brightness, such as vehicle-mounted car navigation systems.

Therefore, it is possible to obtain the back light unit 1 which reduces the manufacturing cost and suppresses unevenness in brightness, and a liquid crystal display apparatus having the back light unit.

The present invention is not limited to the above embodiment, but various modifications are possible within the range of the invention. For example, in a modification shown in FIG. 3, each of light-emitting element groups 12a includes one high-brightness LED 12h, one normal-brightness LED 12n, and one low-brightness LED 121 which emits light with a brightness lower than that of the normal-brightness LED, as a plurality of light-emitting elements having brightness levels different from one another. These LEDs are arranged along the side edge of a light guiding plate 11.

The light-emitting element groups 12a are formed by arranging respective high-brightness LEDs 12h, respective normal-brightness LEDs 12n, and respective low-brightness LEDs 121 in the same order through the light-emitting element groups. Therefore, the high-brightness LEDs 12h, the normal-brightness LEDs 12n, and the low-brightness LEDs 121 are repeatedly arranged in the same order along the edge of the light guiding plate 11. All the low-brightness LEDs 121, a power source 141 different from the power sources 14h and 14n, and a resistor 151 are connected in series. The back light unit 1 having the above structure also can achieve the same effect as that of the back light unit in the above embodiment. Further, in this modification, the back light unit 1 is formed of LEDs of three types of brightness levels, that is, the high-brightness LEDs 12h, the normal-brightness LEDs 12n, and the low-brightness LEDs 121. Therefore, the back light unit 1 is formed by using all the manufactured LEDs classified into the three types of brightness levels. This improves the use efficiency of LEDs, and further reduces the manufacturing cost, in comparison with back light units formed by using LEDs of 1 or 2 types of brightness levels. Therefore, it is possible to further suppress rise in the price of the back light unit 1, and consequently the price of the liquid crystal display apparatus.

Further, the light source 12 may be formed by arranging a plurality of light-emitting element groups including a plurality of LEDs having different brightness levels along the side edge of the light guiding plate. Each light-emitting group includes some of the LEDs which have the different brightness levels, and each of the brightness levels is common to two or more of the some LEDs included in the light-emitting group. In this modification, each of the light-emitting element groups 12a is formed by arranging its LEDs having the same brightness level adjacent to each other, and arranging the LEDs in the same order. Specifically, as shown in FIG. 4, the light source 12 has a structure in which each light-emitting element group 12a has two high-brightness LEDs 12h and two normal-brightness LEDs 12n, the two LEDs of the same brightness in each light-emitting element group are arranged adjacent to each other, and the high-brightness LEDs and the normal-brightness LEDs are arranged in the same order through the light source 12. The light source 12 is not limited to a combination of the high-brightness LEDs 12h and the normal-brightness LEDs 12n, or a combination of the high-brightness LEDs, normal-brightness LEDs and low-brightness LEDs. The light source 12 may be formed of a combination of the high-brightness LEDs and the low-brightness LEDs, and a combination of the normal-brightness LEDs and the low-brightness LEDs. The number of LEDs arranged on a side edge of the light guiding plate 11 can be changed in accordance with the brightness of the LEDs and the size of the display screen.

Although the LEDs are provided opposite to one side edge of the light guiding plate 11 in the above embodiment, the LEDs may be provided opposite to both side edges of the light guiding plate 11 as a matter of course.

What is claimed is:

1. An apparatus for suppressing unevenness of brightness levels in a lighting apparatus, comprising:
    a light guiding plate; and
    a light source including a plurality of light-emitting elements configured to emit light at a plurality of different brightness levels under the same operating conditions, the light emitting elements being provided opposite to a side edge of the light guiding plate and arranged along the side edge of the light guiding plate,
    wherein the light-emitting elements are divided into a plurality of sets according to their different brightness levels, wherein the light emitting elements within each set are of the same brightness level, and each set has a different brightness level, and the light-emitting elements of the same brightness level in each of the sets are connected in series, whereby unevenness of the brightness levels of the light-emitting elements is suppressed.

2. The lighting apparatus according to claim 1, wherein the light source is formed by arranging a plurality of light-emitting element sets into groups including the light-emitting elements along the side edge of the light guiding plate, each light-emitting group including two or more sets of the light-emitting elements which have brightness levels different from each other, and
    the light-emitting element groups are formed by arranging the respective light-emitting elements of the sets in a same order throughout the light-emitting element groups.

3. The lighting apparatus according to claim 1, wherein
    the light source is formed by arranging a plurality of light-emitting element sets into groups along the side edge of the light guiding plate, each light-emitting group includes sets of light-emitting elements which have different brightness levels, each of the brightness levels is common to two or more of the some light-emitting elements included in the light-emitting sets of the group, and
    each of the light-emitting element groups is formed by arranging the two or more sets including light-emitting elements having a same one of the brightness levels adjacent to each other, and arranging some of the light-emitting elements in a same order.

4. The lighting apparatus according to claim 1, further comprising:
    a plurality of power sources and a plurality of resistors,
    wherein the sets of the light-emitting elements are connected to one of the power sources different from each other and one of the resistors different from each other in series.

5. An apparatus for suppressing unevenness of brightness levels in a liquid crystal display apparatus comprising:
    a lighting apparatus having a light guiding plate, and a light source including a plurality of light-emitting elements configured to emit light at a plurality of different brightness levels under the same operating conditions, the light emitting elements being provided opposite to a side edge of the light guiding plate and arranged along the side edge of the light guiding plate; and
    a liquid crystal display panel having an array substrate provided opposite to a light emission surface of the light guiding plate, an opposed substrate provided opposite to the array substrate with a gap therebetween, and a liquid crystal layer held between the array substrate and the opposed substrate,
    wherein the light-emitting elements are divided into a plurality of sets according to their different brightness levels, wherein the light emitting elements within each set are of the same brightness level, and each set has a different brightness level, and the light-emitting elements of the same brightness level in each of the sets are connected in series, whereby unevenness of the brightness levels of the light-emitting elements is suppressed.

6. The apparatus of claim 1, wherein light emitting elements of different brightness levels are arranged alternatively in a line.

7. The apparatus of claim 1, wherein groups of light emitting elements of different brightness levels are arranged alternatively in a line.

8. The apparatus of claim 5, wherein light emitting elements of different brightness levels are arranged alternatively in a line.

9. The apparatus of claim 5, wherein groups of light emitting elements of different brightness levels are arranged alternatively in a line.

* * * * *